United States Patent
Cluzel

(10) Patent No.: US 6,367,527 B1
(45) Date of Patent: Apr. 9, 2002

(54) TIRE HAVING AN H/S FORM RATIO OF <0.6

(75) Inventor: Guy Cluzel, Beaumont (FR)

(73) Assignee: Compagnie Générale des Etablissements Michelin - Michelin & Cie, Clermont-Ferrand Cedex (FR)

(*) Notice: Subject to any disclaimer, the term of this patent is extended or adjusted under 35 U.S.C. 154(b) by 0 days.

(21) Appl. No.: 09/373,859

(22) Filed: Aug. 13, 1999

Related U.S. Application Data

(63) Continuation of application No. PCT/EP98/00911, filed on Feb. 18, 1998.

(30) Foreign Application Priority Data

Feb. 24, 1997 (FR) .............................................. 97/02277
Feb. 18, 1998 (WO) ................................ PCT/EP98/00911

(51) Int. Cl.[7] .............................. B60C 3/00; B60C 3/04; B60C 9/18; B60C 9/20; B60C 9/22
(52) U.S. Cl. ........................ 152/527; 152/454; 152/526; 152/531; 152/534; 152/538
(58) Field of Search ................................ 152/454, 531, 152/534, 526, 527, 538

(56) References Cited

U.S. PATENT DOCUMENTS 5,738,740 A 4/1998 Cluzel

FOREIGN PATENT DOCUMENTS

FR 2501126 9/1982
GB 2064445 6/1981

OTHER PUBLICATIONS

Patent Abstracts of Japan, vol. 017, No. 389, JP 05 069702, Toyo Tire & Rubber Co., publication date: Mar. 23, 1993.

Patent Abstracts of Japan, vol. 12, No. 152, JP 62 2273837, Yokohama Rubber Co Ltd. The, Publication date: Nov. 27, 1987.

*Primary Examiner*—Adrienne C. Johnstone
(74) *Attorney, Agent, or Firm*—Baker Botts L.L.P.

(57) ABSTRACT

A tire, the H/S form ratio of which is at most 0.6, formed radially from the inside to the outside by a triangulation ply of metal cables oriented at least 60°, two working crown plies formed of inextensible metal cables oriented at angles of between 10° and 45°, between which there is inserted a first additional ply of metallic elements which are oriented substantially parallel to the circumferential direction of the tire, a second additional ply being arranged, on either side of the tire, radially above the outermost working ply and substantially centered on the end of the first additional ply.

6 Claims, 1 Drawing Sheet

US 6,367,527 B1

TIRE HAVING AN H/S FORM RATIO OF < 0.6

This is a continuation of PCT/EP 98/00911, filed Feb. 18, 1998.

BACKGROUND OF INVENTION

The invention relates to a tire with radial carcass reinforcement anchored in each bead to at least one bead wire, and comprising a crown reinforcement formed by at least two so-called working plies, superposed and made of wires or cables which are parallel to each other in each ply and are crossed from one to the next, forming angles of at most 40° in absolute value with the circumferential direction of the tire.

More particularly, it relates to a "heavy vehicle" -type tire, the ratio of the height above rim H to the maximum axial width S of which is at most 0.60, and which is intended to be fitted on a medium- or high-tonnage vehicle, such as a lorry, bus, trailer, etc.

Tires having crown reinforcements composed firstly of so-called working plies formed of cables oriented at a certain angle with the circumferential direction and secondly of additional plies formed of cables oriented substantially circumferentially are widely known. An example of such tire structure is illustrated and described in U.S. Pat. 3,677,319. In that tire structure the working plies are formed of metallic elements oriented at angles of between 18° and 75° and the additional plies are formed of textile cables oriented at 0°. Such a structure makes it possible to reconcile the contradictory qualities which are desired in a tire: for example, road-holding of the vehicle and comfort, wear resistance and rolling resistance. The additional textile plies may be arranged either beneath or on top of or between the plies of metal cables, the width of the textile assembly being between 25 and 75% of the width of the metallic structure.

French Patent 2,419,185 discloses that the type of tire in question, with a low H/S ratio, although it has numerous advantages, also has a certain number of disadvantages, such as poor adhesion of the equatorial zone of the tread or localization of high pressures in the region of the edges of the tread, due to the shortening of the area of contact in the longitudinal direction of the tire. In order to overcome these disadvantages, the cited French patent recommends arranging between the carcass reinforcement and the radially inner working ply, in two zones distant from the equatorial plane, two limiting blocks each formed of two superposed plies of inextensible cables, crossed from one ply to the other, forming opposed angles with the circumferential direction which are at most equal in absolute value to half the smallest angle used in the working plies, and other than 0°.

The two solutions mentioned above have not been completely satisfactory for improving the endurance of the crown reinforcement of the "heavy-vehicle" tire of form ratio of at most 0.6. The problem of endurance presented by the tire of the type in question becomes very complicated: the lack of endurance relates both to the lack of resistance to separation between crown ply ends and to the lack of fatigue strength of the cables of the portion of carcass reinforcement, the meridian profile of which is parallel to the profile of the crown reinforcement, and also to the lack of resistance to separation between the carcass reinforcement and crown reinforcement.

In order to improve said endurance, Application WO 96/20095 describes a crown reinforcement comprising at least two working crown plies of inextensible cables, crossed from one ply to the next, forming angles of between 10° and 45° with the circumferential direction, said plies having widths at least equal to 80% of the maximum axial width $S_0$ of the carcass reinforcement, and characterized in that an axially continuous ply formed of inextensible metal cables forming with the circumferential direction an angle of at least 60° and having an axial width at least equal to the axial width of the shortest working crown ply, is arranged firstly between the carcass reinforcement and the working ply radially closest to the axis of rotation, and in that an additional ply formed of metallic elements oriented substantially parallel to the circumferential direction, the axial width of said ply being at least equal to 0.7 $S_0$, and its modulus of elasticity upon traction being at most equal to the modulus of elasticity of the most extensible working ply, is arranged between the two working crown plies.

Despite the progress made, such a tire of H/S form ratio of at most 0.45 (H being the height of the tire on its mounting rim and S its maximum axial width), intended to replace the set of two dual wheels on a driving axle, has to be improved from the point of view of overall endurance in order to compare favorably with said assembly, and in particular has to be improved in regard to resistance to separation between the carcass reinforcement and crown reinforcement and fatigue strength of the circumferentially oriented cables of the additional ply.

SUMMARY OF THE INVENTION

It might have been logical to assume that a modification of structure would have to affect the two regions in which are located the ends of the ply of cables oriented with an angle of at least 60° and the ends of the first working ply, and that one possible solution for double problem would have been to increase the width of the ply of circumferential cables. To the great surprise of the inventor, although in fact it proved necessary to increase the number of circumferential cables, this increase does not have to be effected by widening the ply of circumferential cables but by the addition of a second additional ply of circumferential cables of small axial width, arranged radially above the second working ply, that is to say in the extension, respectively on either side of the crown reinforcement, of the radially outermost ply of elastic cables, referred to as protective ply, and by covering the ends of the ply of circumferential cables.

Thus the tire according to the invention, comprising a radial carcass reinforcement surmounted by a crown reinforcement comprising at least two working crown plies of inextensible cables, crossed from one ply to the next, forming angles of between 10° and 45° with the circumferential direction, said plies having widths at least equal to 80% of the maximum axial width $S_0$ of the carcass reinforcement, and, arranged, firstly, between the carcass reinforcement and the working ply radially closest to the axis of rotation, an axially continuous ply formed of inextensible metal cables forming with the circumferential direction an angle of at least 60° and the axial width of which is at least equal to the axial width of the shortest working crown ply, and, secondly, arranged between the two working crown plies, a first additional ply formed of metallic elements oriented substantially parallel to the circumferential direction, the axial width of said ply being at least equal to 0.7 $S_0$, and the modulus of elasticity upon traction of which is at most equal to the modulus of elasticity of the most extensible working ply, is characterized in that there is arranged, radially above the radially outermost working crown ply and on either side of the tire, a second additional ply formed of metallic elements oriented substantially parallel to the circumferential direction, of small width and such that it radially covers the end of the first additional ply of circumferential cables which is arranged between the two working plies.

"Inextensible cable" is to be understood to mean a cable, for example of steel, which has a relative elongation of less than 0.2% at 10% of the breaking load.

Wires or cables oriented substantially parallel to the circumferential direction are wires or cables which form angles within the range +2.5°, −2.5° around 0° with said direction.

A modulus of elasticity upon traction of a ply of cables results from the tensile stress, exerted in the direction of the cables, necessary to obtain a given relative elongation $\in$, said modulus being a tangent modulus. "Elasticity modulus of the additional ply which is at most equal to the modulus of elasticity of the most extensible working ply" is to be understood to mean that the tangent modulus of the additional ply, whatever the relative elongation, is at most equal to the tangent modulus of the most extensible working ply whatever the relative elongation, the most extensible ply being the ply which, for each value of tensile stress, has a relative elongation greater than that of the other ply for the same stress.

Advantageously, the modulus of the second additional ply is equal to that of the first additional ply, and will be such that it is small for a relative elongation of between 0% and 0.4%, and at most equal to the greatest modulus of elasticity upon traction of the most extensible working ply, for relative elongations greater than 0.4%.

Within the above framework, the additional plies can be formed of so-called elastic cables, having a curve of tensile stress as a function of the relative elongation which has shallow gradients for the slight elongations and a substantially constant and steep gradient for the greater elongations. The additional plies may also be formed of cables oriented circumferentially and cut so as to form sections of a length very much less than the circumference of the least long ply, but preferably greater than 0.1 times said circumference, the cuts between sections being axially offset relative to each other. Such an embodiment makes it possible to impart to the additional plies a given modulus, whatever it may be, in simple manner.

The second additional ply has its width substantially centered on the end of the first additional ply, such that its own ends are axially distant from the end of the first additional ply by at least 10 mm, a narrow width of ply being a width of between 15 and 50 mm. It is advantageous for said second additional ply axially to extend the radially outermost ply, referred to as protective ply, generally formed of so-called elastic cables forming an angle of the same direction and substantially of the same value as the angle of the subjacent working ply with the circumferential direction, said extension being produced by leaving only a gap of small width (<5 mm) between the axially inner end of the additional ply and the axially outer end of the ply of elastic cables.

The characteristics and advantages of the invention will be better understood with the aid of the following description which relates to the drawings, which illustrate examples of embodiment in non-limitative manner.

DESCRIPTION OF PREFERRED EMBODIMENTS

Figure 1:
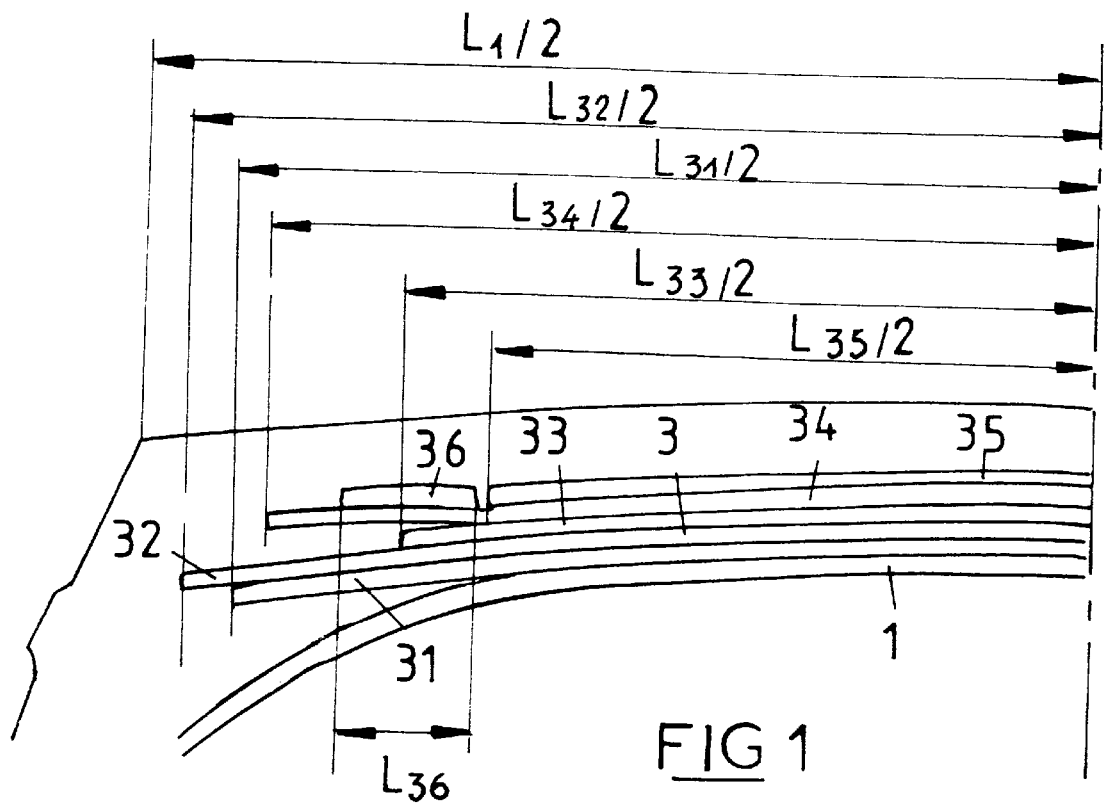
FIG. 1 shows a diagram, viewed in meridian section, of a crown reinforcement according to the invention.

The tire P, of dimension 495/45 R 22.5 X, has an H/S form ratio of 0.45, H being the height of the tire P on its mounting rim and S its maximum axial width. Said tire P comprises a radial carcass reinforcement 1 anchored in each bead to at least one bead wire, forming an upturn, and formed by a single ply of metal cables. This carcass reinforcement 1 is hooped by a crown reinforcement 3, formed radially from the inside to the outside

- by a first ply 31 of inextensible metal cables oriented relative to the circumferential direction by an angle δ of 65°, the object of said ply being to absorb a major part of the axial compression forces to which the radial carcass reinforcement 1 may be subjected,
- radially above and covering the preceding so-called triangulation ply, by a first working ply 32 formed of inextensible metal cables oriented by an angle α, equal to 18° in the case illustrated,
- surmounting the first working ply 32, by a first additional ply 33 formed of inextensible metallic elements of a circumferential length substantially equal to ⅙ of the circumferential length of the ply 33, said elements being oriented at 0°, then by a second working ply 34 formed of metal cables identical to those of the first working ply 32, and forming an angle β, opposed to the angle α and, in the case illustrated, equal to said angle α of 18° (but possibly being different from said angle α), with the circumferential. direction,
- then by a final ply of so-called elastic cables oriented relative to the circumferential direction by an angle γ of the same direction as the angle β and equal to said angle β (but possibly being different from said angle), this final ply being a protective ply,
- and finally, on either side of the tire, by a second additional ply 36 formed of inextensible metallic elements of circumferential length substantially equal to ⅙ of the circumferential length of the ply 33, said elements being oriented at 0°, that is to say, of elements identical to those of the first additional ply 33.

The axial width $L_{32}$ of the first working ply 32 is equal to 0.87 times the maximum axial width $S_0$ of the center section of the carcass reinforcement 1, namely 416 mm, which, for a tire of conventional shape, is substantially less than the width $L_1$ of the tread, which is equal in the case in question to 430 mm. The axial width $L_{34}$ of the second working ply 34 is equal to 0.8 times the axial width $S_0$, namely 400 mm. The triangulation ply 31 has an axial width $L_{31}$ equal to the arithmetical mean of the widths of the two working plies 32 and 34, and in this case to 408 mm. As for the axial width $L_{33}$ of the additional ply 33, which is at least equal to 0.7 $S_0$, it is equal to 350 mm, which represents 0.73 $S_0$. In fact, the width $L_{33}$ of the additional ply 33 is less than the width $L_{32}$ ($L_{34}$) of the least wide working ply, without, however, being too small so as to contribute effectively to the reduction of the operating temperatures of the tire close to the ends of the working crown plies, which are the regions most adversely affected by the heating and the separation between plies. The final crown ply 35, referred to as a protective ply, has a width $L_{35}$ which is less than the previous ones, namely 320 mm. As for the width $L_{36}$ of the ply 36, it is, in the example cited, 25 mm and such that its circumferential axis of symmetry is radially above the end of the first additional ply 33. The gap between the axially inner end of the ply 36 and the end of the so-called protective ply 35 is then 2.5 mm.

The elastic modulus of traction of the working ply 32 or of the working ply 34, which in this case are identical, since they are formed by the same hooped 27.23 metal cables which are inextensible and continuous over the entire width of the ply, said cables being arranged with the same pitch, that is to say with the same space between cables, is equal to 5300 daN/mm² at 0.4% relative elongation. The modulus, of the same name and measured under the same conditions, of the so-called triangulation ply 31, formed of hooped 9.23 metal cables, is equal to 6925 daN/mm². As for the two additional plies 33 and 36, they are formed of hooped 27.23 metal cables, and cut so as to have sections of cables the circumferential length of which is equal to ⅙ of the circumferential length of the first, least long, ply 33, which imparts to the two plies a common tangent modulus of elasticity upon traction of 3310 daN/mm² for a relative elongation of 0.4%.

Figure 2:
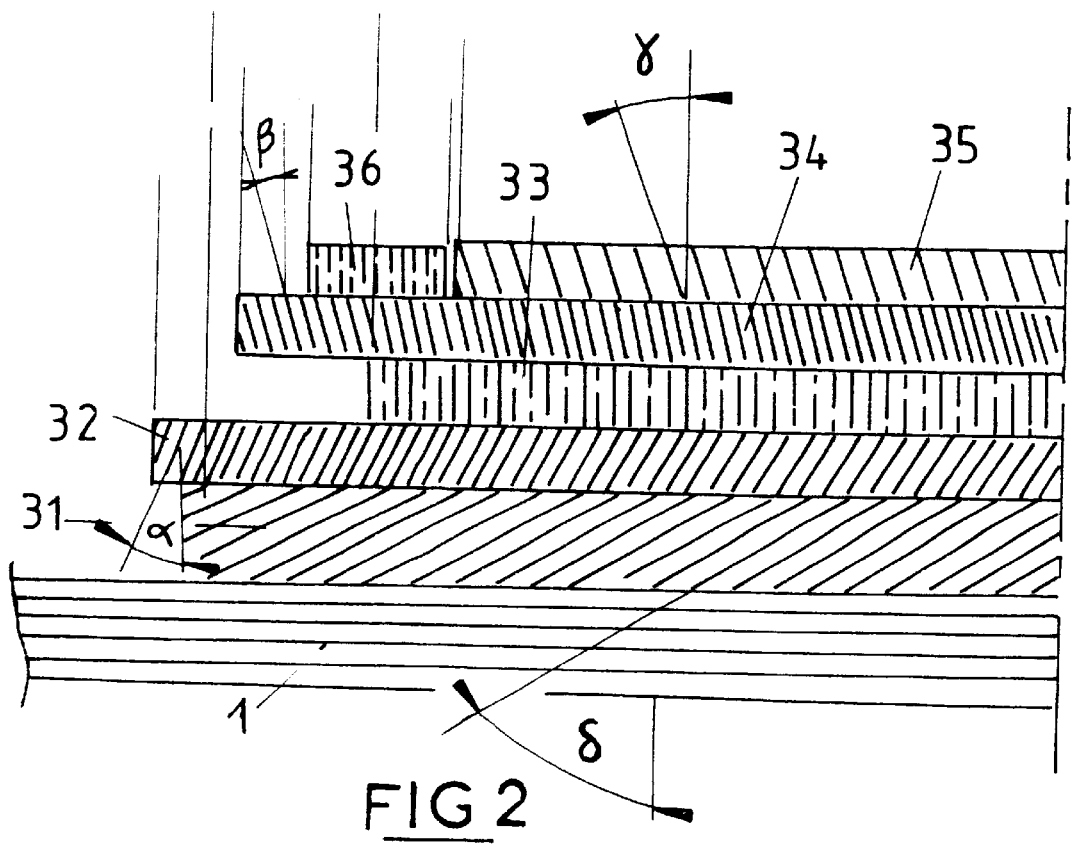
FIG. 2 shows the crown reinforcement of FIG. 1, in plan view and in a partial section.

The additional plies 33 and 36 may also be formed of so-called elastic bimodular cables, that is to say, cables having relative elongations at rupture greater than 2.5% and tensile force-relative elongation curves having two parts having substantially different gradients, such as the curve 17 shown in FIG. 2 of Patent FR 1 188 486. Since reduced elasticity of the plies 33 and 36 is useful only during the shaping of the tire in the vulcanization mold, a cable having a low modulus from the origin to 0.4% relative elongation and a modulus for instance greater than 14000 daN/MM² for the greater relative elongations makes it possible readily to obtain plies of cables oriented substantially at 0° having, above 0.4% relative elongation, a modulus of 5200 daN/mm².

The tire described above was tested, as far as endurance was concerned, compared with a control tire as described in the international application referred to above. Under identical loading conditions (variable load, increasing by stages from 5800 kg onwards) and pressure conditions (regulated inflation pressure of 10 bar), the control tires covered 11,500 km on a test drum (average of two results) while the tires according to the invention covered 31,900 km (average of 5 results), which represents a very significant improvement, given the severity of the test.

I claim:

1. A tire comprising a radial carcass reinforcement (1) surmounted by a crown reinforcement (3) comprising at least two working crown plies (32, 34) of inextensible cables, crossed from one ply to the next, forming angles ($\alpha$, $\beta$) of between 10° and 45° with the circumferential direction, said plies having widths $L_{32}$, $L_{34}$ at least equal to 80% of the maximum axial width $S_0$ of the carcass reinforcement and including, firstly, between the carcass reinforcement and the working ply (32) radially closest to the axis of rotation, an axially continuous ply (31) formed of inextensible metal cables forming with the circumferential direction an angle $\delta$ of at least 60° and the axial width $L_{31}$ of which is at least equal to the axial width $L_{32}$, $L_{34}$ of the narrowest working crown ply (32, 24), and including, secondly, between the two working crown plies, a first additional ply (33) formed of metallic elements oriented substantially parallel to the circumferential direction, the axial width $L_{33}$ of said first additional ply being at least equal to 0.7 $S_0$, and the modulus of elasticity upon traction of which is at most equal to the said modulus of the most extensible working ply (33, 34), characterized in that there is arranged, radially above the radially outermost working crown ply (34) and on either side of the tire, a second additional ply (36) formed of metallic elements oriented substantially parallel to the circumferential direction, of narrow width $L_{36}$ substantially centered on the end of the first additional ply (33) such that the ends of said second additional ply are axially distant from each end of the first additional ply by at least 10 mm and such that said second additional ply radially covers the end of the first additional ply of circumferential cables which is arranged between the two working plies.

2. A tire according to claim 1, characterized in that the modulus of elasticity upon traction of the second additional ply is equal to the said modulus of the same name of the first additional ply.

3. A tire according to claim 2, characterized in that the common modulus of the additional plies is low for a relative elongation of between 0% and 0.4%, and at most equal to the greatest modulus of elasticity upon traction of the most extensible working ply, for relative elongations greater than 0.4%.

4. A tire according to claim 3, characterized in that the additional plies are formed of elastic cables, having a curve of tensile stress as a function of the relative elongation which has shallow gradients for the slight elongations of between 0 and 0.4% and a steep and substantially constant gradient for the greater elongations.

5. A tire according to claim 3, characterized in that the additional plies are formed of cables oriented circumferentially and cut so as to form sections of a length very much less than the circumference of the least long ply, the cuts between sections being axially offset relative to each other.

6. A tire according to claim 1, characterized in that the crown reinforcement furthermore comprises, radially furthest to the outside, a protective ply (35), formed of elastic cables forming an angle of the same direction and substantially the same value as the angle of the subjacent working ply (34) with the circumferential direction, and in that the second additional ply (36) has a width of between 15 and 50 mm, said second additional ply (36) axially extending the protective ply (35), and said extension being produced leaving only a gap of less than 5 mm between the axially inner end of the second additional ply and the axially outer end of the protective ply of elastic cables.

* * * * *

UNITED STATES PATENT AND TRADEMARK OFFICE
CERTIFICATE OF CORRECTION

PATENT NO. : 6,367,527 B1 Page 1 of 1
DATED : April 9, 2002
INVENTOR(S) : Guy Cluzel It is certified that error appears in the above-identified patent and that said Letters Patent is hereby corrected as shown below:

Column 4,
Line 42, "0.87" should read -- 0.87 0 (no bold)

Column 6,
Line 21, "same name" should read -- said modulus --

Signed and Sealed this

Second Day of July, 2002

Attest:

Attesting Officer

JAMES E. ROGAN
Director of the United States Patent and Trademark Office